(12) United States Patent
Ding et al.

(10) Patent No.: US 10,915,767 B2
(45) Date of Patent: Feb. 9, 2021

(54) METHODS AND SYSTEMS FOR PARKING LINE MARKER DETECTION AND PAIRING AND PARKING SPOT DETECTION AND CLASSIFICATION

(71) Applicant: Volvo Car Corporation, Gothenburg (SE)

(72) Inventors: Sihao Ding, Mountain View, CA (US); Minming Zhao, Mountain View, CA (US); Ying Li, Sunnyvale, CA (US); Andreas Wallin, Billdal (SE); Harshavardhan Reddy Dasari, Sunnyvale, CA (US); Gambhir Bista, San Jose, CA (US)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/568,331

(22) Filed: Sep. 12, 2019

(65) Prior Publication Data

US 2020/0089974 A1    Mar. 19, 2020

Related U.S. Application Data

(60) Provisional application No. 62/730,856, filed on Sep. 13, 2018.

(51) Int. Cl.
  *G06K 9/00* (2006.01)
  *G06T 7/11* (2017.01)
  (Continued)

(52) U.S. Cl.
  CPC ........... *G06K 9/00812* (2013.01); *B60R 1/00* (2013.01); *B62D 15/0285* (2013.01); *G06T 7/11* (2017.01);
  (Continued)

(58) Field of Classification Search
  CPC .......... G06K 9/00812; G06T 7/11; G06T 2207/30264; B60R 1/00; B60R 2300/105;
  (Continued)

(56) References Cited

U.S. PATENT DOCUMENTS 9,260,090 B2   2/2016  Toledo et al.
9,449,512 B2   9/2016  Zafiroglu et al.
(Continued)

OTHER PUBLICATIONS

Feb. 7, 2020 European Search Report issued on International Application No. 19196530.

*Primary Examiner* — Ojiako K Nwugo
(74) *Attorney, Agent, or Firm* — Clements Bernard Walker; Christopher L. Bernard

(57) ABSTRACT

Parking spot detection methods and systems that detect and pair parking line markers, improving the accuracy and speed of parking spot detection in vehicular driver assist (DA) and autonomous driving (AD) applications. These methods and systems incorporate three major steps: (1) preprocessing—one or more standard camera images are input into the algorithm and a bird's-eye-view (BEV) image is output from the algorithm; (2) deep neural network (DNN) segmentation of the parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spots are output from the algorithm.

18 Claims, 11 Drawing Sheets

(51) Int. Cl.
    *B60R 1/00*         (2006.01)
    *B62D 15/02*      (2006.01)

(52) U.S. Cl.
    CPC ... *B60R 2300/105* (2013.01); *B60R 2300/607* (2013.01); *B60R 2300/806* (2013.01); *G06T 2207/30264* (2013.01)

(58) Field of Classification Search
    CPC ........ B60R 2300/607; B60R 2300/806; B62D 15/0285
    USPC ...................................................... 340/932.2
    See application file for complete search history.

(56) References Cited

U.S. PATENT DOCUMENTS

| | | |
|---|---|---|
| 9,696,420 B2 | 7/2017 | Shaffer et al. |
| 9,944,282 B1 | 4/2018 | Fields et al. |
| 10,025,317 B2 | 7/2018 | Batur et al. |
| 10,106,153 B1 * | 10/2018 | Xiao .................. G06K 9/00805 |
| 2008/0136673 A1 | 6/2008 | Jung |
| 2011/0080304 A1 | 4/2011 | Toledo et al. |
| 2015/0279210 A1 | 10/2015 | Zafiroglu et al. |
| 2016/0231133 A1 | 8/2016 | Johnson et al. |
| 2017/0017848 A1 | 1/2017 | Gupta et al. |
| 2017/0177954 A1 * | 6/2017 | Micks ..................... G06T 17/05 |
| 2017/0267233 A1 | 9/2017 | Minster et al. |
| 2017/0329346 A1 | 11/2017 | Latotzki |
| 2018/0056872 A1 | 3/2018 | Taylor et al. |
| 2018/0095474 A1 | 4/2018 | Batur et al. |
| 2018/0201256 A1 | 7/2018 | Tseng et al. |
| 2019/0033867 A1 * | 1/2019 | Sharma ................ G05D 1/0246 |
| 2019/0066503 A1 * | 2/2019 | Li .......................... G08G 1/168 |
| 2020/0090516 A1 * | 3/2020 | Sert ...................... G06K 9/4628 |

* cited by examiner

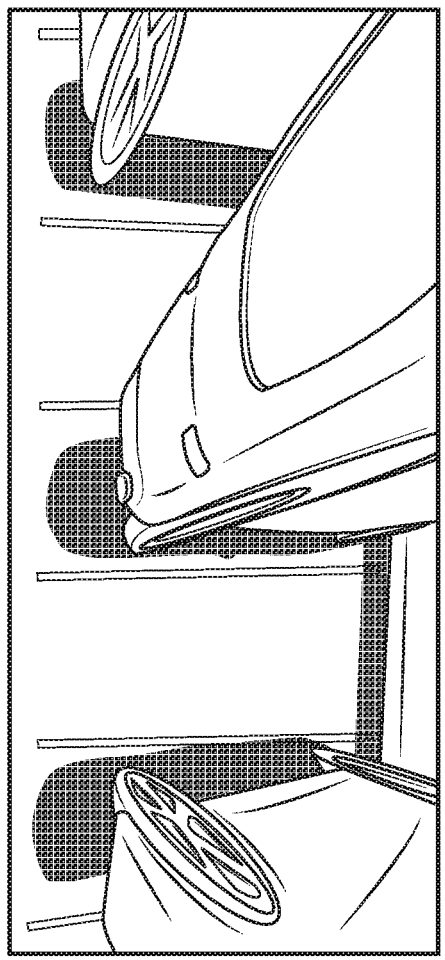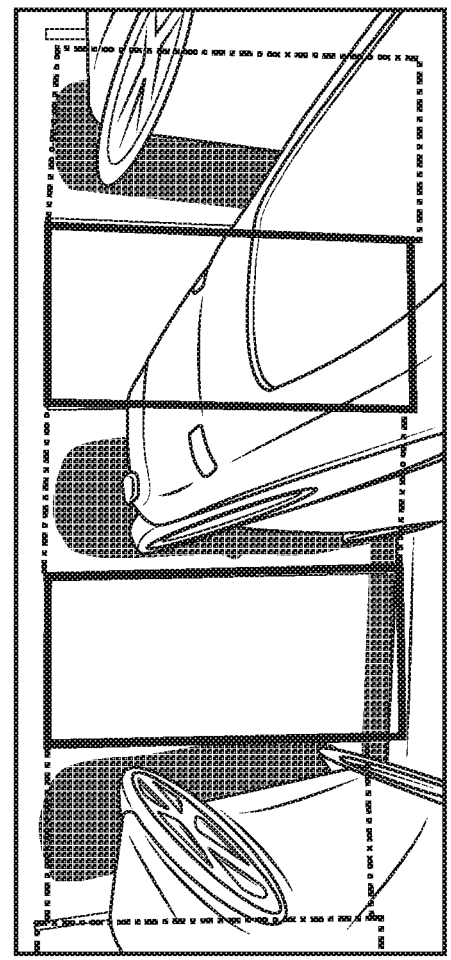
Fig. 11

METHODS AND SYSTEMS FOR PARKING LINE MARKER DETECTION AND PAIRING AND PARKING SPOT DETECTION AND CLASSIFICATION

CROSS-REFERENCE TO RELATED APPLICATION

The present disclosure claims the benefit of priority of U.S. Provisional Patent Application No. 62/730,856, filed on Sep. 13, 2018, and entitled "METHODS AND SYSTEMS FOR PARKING LINE MARKER DETECTION AND PAIRING AND PARKING SPOT DETECTION AND CLASSIFICATION," the contents of which are incorporated in full by reference herein.

FIELD OF THE INVENTION

The present invention relates generally to vehicular driver assist (DA) and autonomous driving (AD) systems and methods. More specifically, the present invention relates to methods and systems for parking line marker detection and pairing and parking spot detection and classification.

BACKGROUND OF THE INVENTION

Vehicular DA and AD systems often provide parking guidance and self-parking functionalities to an operator. In the parking guidance case, one or more camera images of a parking spot are displayed to the operator, showing the operator the position of his or her vehicle relative to the parking spot and optionally providing an alert if the vehicle is misaligned with the parking spot during a parking maneuver. In the self-parking case, the vehicle itself detects the parking spot from one or more camera images and performs the parking maneuver, constantly monitoring the position of the vehicle relative to the parking spot. In either case, parking spots must be segmented from the one or more camera images. This is typically done via segmentation of the associated parking line markers, which indicate the position, shape, size, and orientation of the parking spots, often using an artificial intelligence (AI) algorithm. The AI algorithm looks for "learned" shapes that resemble parking spots. This process, however, can be inaccurate and time consuming. Thus, what are still needed in the art are improved parking spot detection methods and systems.

BRIEF SUMMARY OF THE INVENTION

In various aspects, the present invention provides parking spot detection methods and systems that detect and pair parking line markers, improving the accuracy and speed of parking spot detection in vehicular DA and AD applications. These methods and systems incorporate three major steps: (1) preprocessing—one or more standard camera images are input into the algorithm and a bird's-eye-view (BEV) image is output from the algorithm; (2) deep neural network (DNN) segmentation of the parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spots are output from the algorithm.

The BEV image is a partial or complete 360-degree "overhead" view of the vehicle and its surroundings generated by transforming and optionally stitching together the standard front, side, and rear camera images obtained using one or more "fisheye" cameras or the like. Such images are very helpful in displaying and assessing the position of the vehicle relative to its surroundings in various applications.

Although "cameras" are specifically referred to herein, it will be readily apparent to persons of ordinary skill in the art that any "sensors" operable for obtaining suitable "images" may be used equally, provided that parking line markers and the associated parking spots may be "visualized."

In one aspect, the present invention provides a method for detecting a parking spot in a camera image, including: obtaining one or more camera images from one or more vehicle cameras, wherein the one or more camera images include one or more of a front camera image, a left-side camera image, a right-side camera image, and a rear camera image; preprocessing the one or more camera images by transforming the one or more camera images into a bird's-eye-view camera image; segmenting a plurality of parking line markers from the bird's-eye-view camera image using a deep neural network and outputting a binary image distinguishing the plurality of segmented parking line markers from other portions of the image; and selecting and pairing certain parking line markers to detect one or more parking spots in one or more of the bird's-eye-view camera image and the one or more camera images. The method further includes one or more of: displaying the detected one or more parking spots to an operator superimposed on one or more of the bird's-eye-view camera image and the one or more camera images in a driver assist application and using the detected one or more parking spots to maneuver a vehicle in an autonomous driving application. The preprocessing includes calibrating the one or more vehicle cameras to obtain parameters and distortion coefficients, undistorting the one or more camera images using the parameters and distortion coefficients, calculating a homographic matrix by mapping coordinates in one or more image planes of the one or more camera images to coordinates in a ground plane of the bird's-eye-view camera image, and transforming the one or more camera images into the bird's-eye-view camera image using the homographic matrix. The segmenting includes using an "encoder" network for feature extraction and a "decoder" network for upsampling and generating results from encoded features. The deep neural network is trained using a plurality of annotated and labeled images, wherein the images are per-pixel annotated with polylines, wherein a predefined width is assigned to the polylines, and wherein only center positions of parking line markers are annotated. Optionally, the selecting and pairing includes using the binary image to mask the bird's-eye-view camera image and then running a same pipeline on a predetermined search space. Alternatively, the selecting and pairing includes finding the parking line markers directly from the binary image by separating different connected pixel groups, performing line fitting in each pixel group, grouping based on similarity, finding endpoints, and ultimately pairing the parking line markers accordingly. Optionally, the method further includes superimposing one or more shapes over the detected one or more marking spots in the bird's-eye-view camera image, wherein the one or more shapes are coded with data indicating a parking spot type for each of the detected one or more parking spots.

In another aspect, the present invention provides a system for detecting a parking spot in a camera image, including: one or more vehicle cameras for obtaining one or more camera images, wherein the one or more camera images include one or more of a front camera image, a left-side camera image, a right-side camera image, and a rear camera image; and a processor executing an algorithm for: preprocessing the one or more camera images by transforming the one or more camera images into a bird's-eye-view camera image; segmenting a plurality of parking line markers from the bird's-eye-view camera image using a deep neural network and outputting a binary image distinguishing the plurality of segmented parking line markers from other portions of the image; and selecting and pairing certain parking line markers to detect one or more parking spots in one or more of the bird's-eye-view camera image and the one or more camera images. The system further includes one or more of: a display for displaying the detected one or more parking spots to an operator superimposed on one or more of the bird's-eye-view camera image and the one or more camera images in a driver assist application and a processor executing an algorithm for using the detected one or more parking spots to maneuver a vehicle in an autonomous driving application. The preprocessing includes calibrating the one or more vehicle cameras to obtain parameters and distortion coefficients, undistorting the one or more camera images using the parameters and distortion coefficients, calculating a homographic matrix by mapping coordinates in one or more image planes of the one or more camera images to coordinates in a ground plane of the bird's-eye-view camera image, and transforming the one or more camera images into the bird's-eye-view camera image using the homographic matrix. The segmenting includes using an "encoder" network for feature extraction and a "decoder" network for upsampling and generating results from encoded features. The deep neural network is trained using a plurality of annotated and labeled images, wherein the images are per-pixel annotated with polylines, wherein a predefined width is assigned to the polylines, and wherein only center positions of parking line markers are annotated. Optionally, the selecting and pairing includes using the binary image to mask the bird's-eye-view camera image and then running a same pipeline on a predetermined search space. Alternatively, the selecting and pairing includes finding the parking line markers directly from the binary image by separating different connected pixel groups, performing line fitting in each pixel group, grouping based on similarity, finding endpoints, and ultimately pairing the parking line markers accordingly. Optionally, the algorithm further superimposes one or more shapes over the detected one or more marking spots in the bird's-eye-view camera image, wherein the one or more shapes are coded with data indicating a parking spot type for each of the detected one or more parking spots.

In a further aspect, the present invention provides a vehicle, including: one or more vehicle cameras for obtaining one or more camera images, wherein the one or more camera images include one or more of a front camera image, a left-side camera image, a right-side camera image, and a rear camera image; and a system for detecting a parking spot in a camera image including a processor executing an algorithm for: preprocessing the one or more camera images by transforming the one or more camera images into a bird's-eye-view camera image; segmenting a plurality of parking line markers from the bird's-eye-view camera image using a deep neural network and outputting a binary image distinguishing the plurality of segmented parking line markers from other portions of the image; and selecting and pairing certain parking line markers to detect one or more parking spots in one or more of the bird's-eye-view camera image and the one or more camera images. The vehicle further includes one or more of: a display for displaying the detected one or more parking spots to an operator superimposed on one or more of the bird's-eye-view camera image and the one or more camera images in a driver assist application and a processor executing an algorithm for using the detected one or more parking spots to maneuver a vehicle in an autonomous driving application. The preprocessing includes calibrating the one or more vehicle cameras to obtain parameters and distortion coefficients, undistorting the one or more camera images using the parameters and distortion coefficients, calculating a homographic matrix by mapping coordinates in one or more image planes of the one or more camera images to coordinates in a ground plane of the bird's-eye-view camera image, and transforming the one or more camera images into the bird's-eye-view camera image using the homographic matrix. The segmenting includes using an "encoder" network for feature extraction and a "decoder" network for upsampling and generating results from encoded features. Optionally, the selecting and pairing includes using the binary image to mask the bird's-eye-view camera image and then running a same pipeline on a predetermined search space. Alternatively, the selecting and pairing includes finding the parking line markers directly from the binary image by separating different connected pixel groups, performing line fitting in each pixel group, grouping based on similarity, finding endpoints, and ultimately pairing the parking line markers accordingly.

In a still further aspect, the present invention provides a method for detecting a parking spot in a camera image, including one of: (a) detecting and pairing a plurality of parking line markers defining a parking spot therebetween, generating a rectangular representation of the parking spot, and encoding the rectangular representation of the parking spot based on a class/type of parking spot; and (b) generating a rectangular representation of a parking spot using a deep neural network trained to segment parking spots using rectangles. The method further includes detecting and an entrance to the parking spot.

BRIEF DESCRIPTION OF THE DRAWINGS

The present invention is illustrated and described herein with reference to the various drawings, in which like reference numbers are used to denote like method steps/system components, as appropriate, and in which:

FIG. 11 is a BEV image illustrating rectangles drawn to represent parking spots, a given color or coding indicates that a specific parking spot is not occupied, while another given color or coding indicates that a specific parking spot is occupied.

DETAILED DESCRIPTION OF THE INVENTION

Again, the present invention provides parking spot detection methods and systems that detect and pair parking line markers, improving the accuracy and speed of parking spot detection in vehicular DA and AD applications. These methods and systems incorporate three major steps: (1) preprocessing—one or more standard camera images are input into the algorithm and a BEV image is output from the algorithm; (2) DNN segmentation of parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spots are output from the algorithm.

Figure 1:
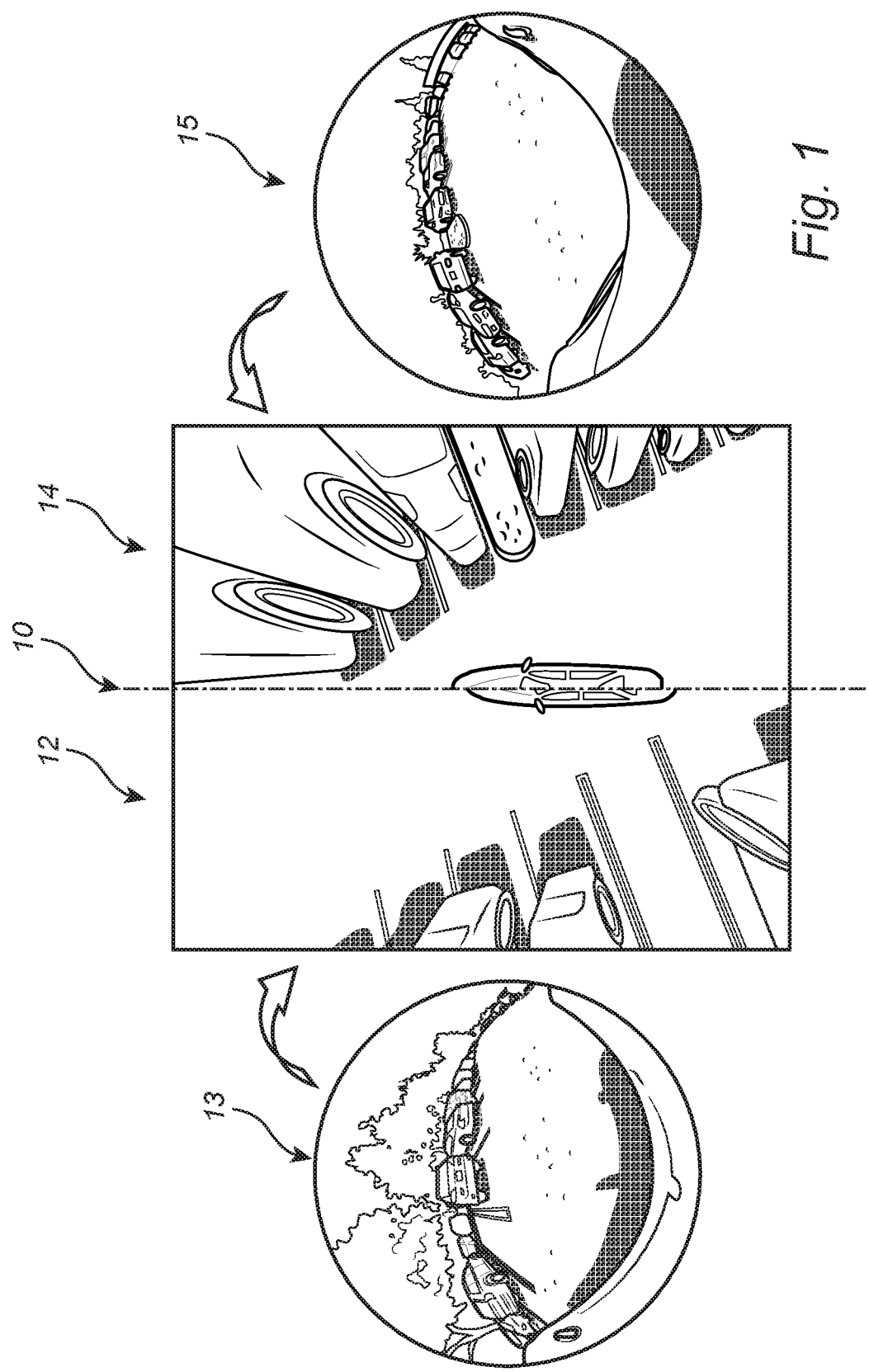
FIG. 1 is a series of camera images illustrating the preprocessing step of the present invention—where one or more standard camera images are input into the algorithm and a BEV image is output from the algorithm.
Figure 9:
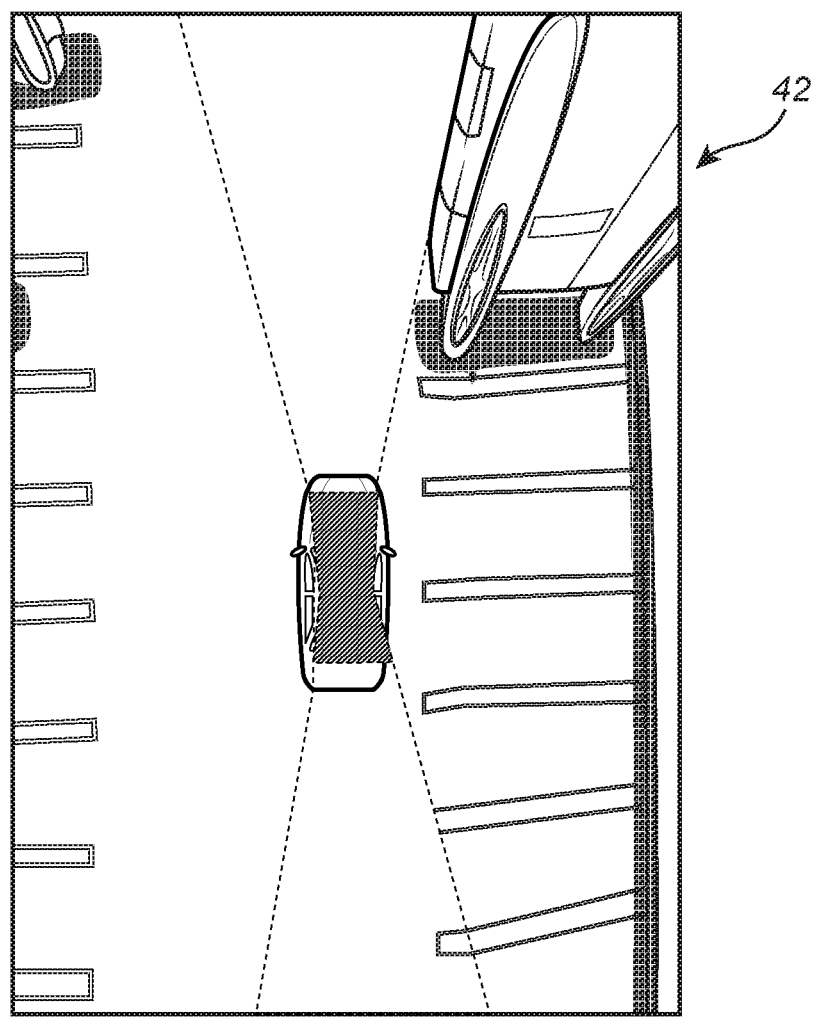
FIG. 9 is an example of a 4-camera BEV image that may be used in conjunction with the methods and systems of the present invention.

Referring now specifically to FIG. 1, the BEV image is a partial or complete 360-degree "overhead" view of the vehicle and its surroundings generated by transforming and optionally stitching together the standard front, side, and rear camera images obtained using one or more "fisheye" cameras or the like. Such images are very helpful in displaying and assessing the position of the vehicle relative to its surroundings in various applications. In this example, a BEV image 10 including a left-side BEV 12 and a right-side BEV 14 is generated from a left camera image 13 and a right camera image 15. The generation of such BEV images is well known to persons of ordinary skill in the art. Here, in the preprocessing step, the camera(s) utilized are first calibrated to obtain parameters and distortion coefficients. Next, the input camera image(s) 13 and 15 are undistorted using these parameters and distortion coefficients. Next, a homographic matrix is created by mapping coordinates in the image plane(s) of the input camera image(s) 13 and 15 to coordinates in the ground plane of the BEV image 10. Finally, the undistorted input camera image(s) 13 and 15 are transformed to the BEV image 10 using this homographic matrix. Note, a 4-camera BEV image 42 is illustrated in FIG. 9 and may be used equally.

Figure 2:
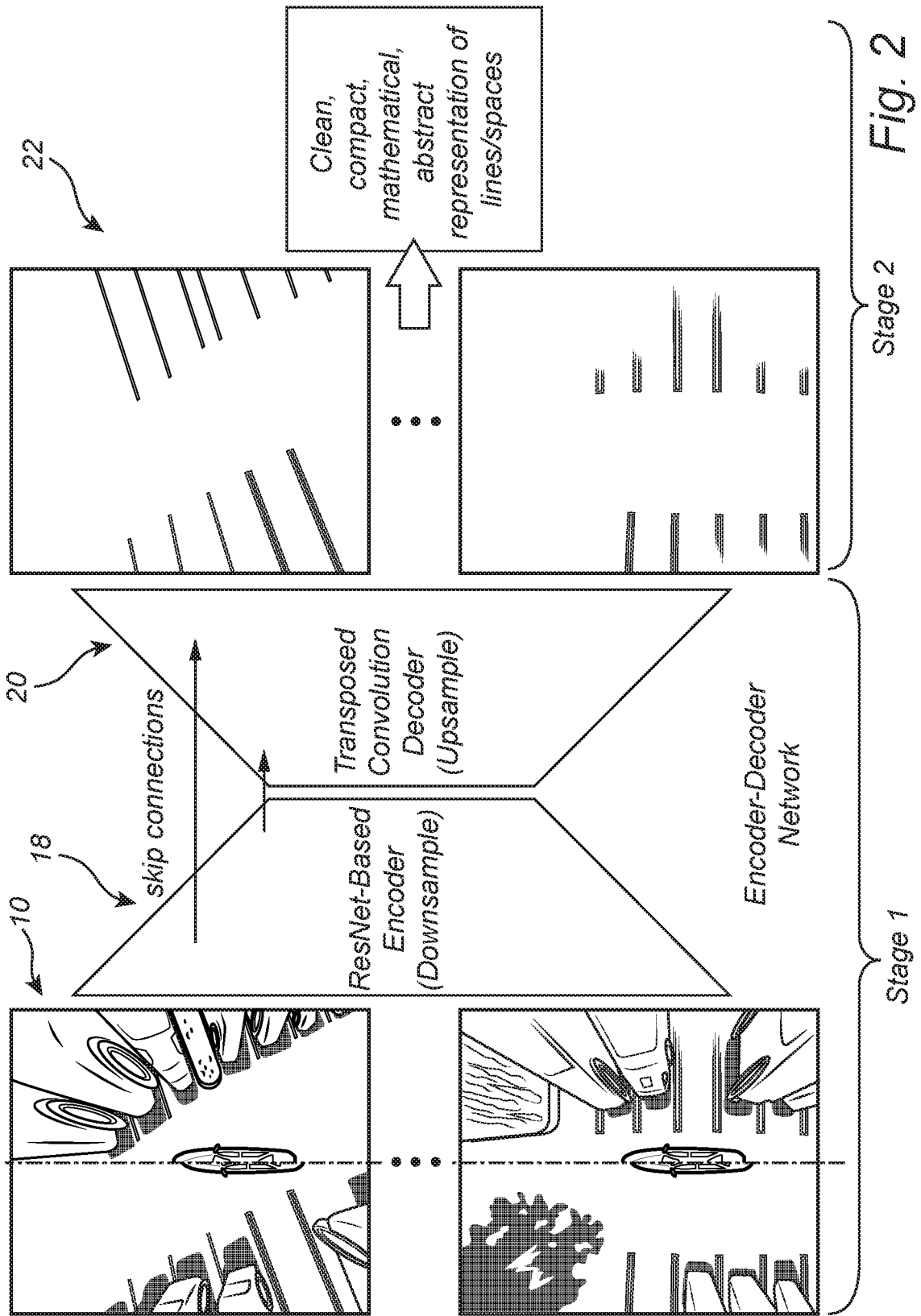
FIG. 2 is a schematic diagram illustrating the DNN segmentation of parking line markers step of the present invention—where the BEV image is input into the algorithm and a binary image is output from the algorithm (with, e.g., the parking line markers areas displayed in white and the background displayed in black)

Referring now specifically to FIG. 2, in the DNN segmentation of parking line markers step, the parking line markers are predicted in the form of binary segments from the input BEV image(s) 10. The DNN used is an image segmentation convolutional neural network (CNN), consisting of an "encoder" network 18 for feature extraction and a "decoder" network 20 for upsampling and generating results from the encoded features. The output of the CNN is one or more binary image(s) 22 (with, e.g., the parking line markers areas displayed in white and the background displayed in black).

The network structure includes Layer 1 . . . Layer N Operations, each having a particular Input Size and a particular Output Size.

Training data must first be prepared, including image annotation and image label creation. In order to formulate this as a segmentation problem, per pixel annotation must be provided. In this case, both the training image labels and predictions are binary images. To reduce the annotation difficulty and improve the annotation speed, the parking line markers are annotated with polylines instead of polygons. Later, a predefined width is assigned to the polylines to further generate binary images as the image labels. In other words, only the center positions of the parking line markers are annotated. This trade-off between the accuracy of the exact line width and annotation efficiency is a design choice that allows rapid annotation, thus enabling large volume of annotations to be obtained.

In the training process, unbalanced classes are handled via Dynamic Weighted Loss, a "Squeeze" Process, etc. Finally, an inference/prediction phase is provided.

Figure 3:
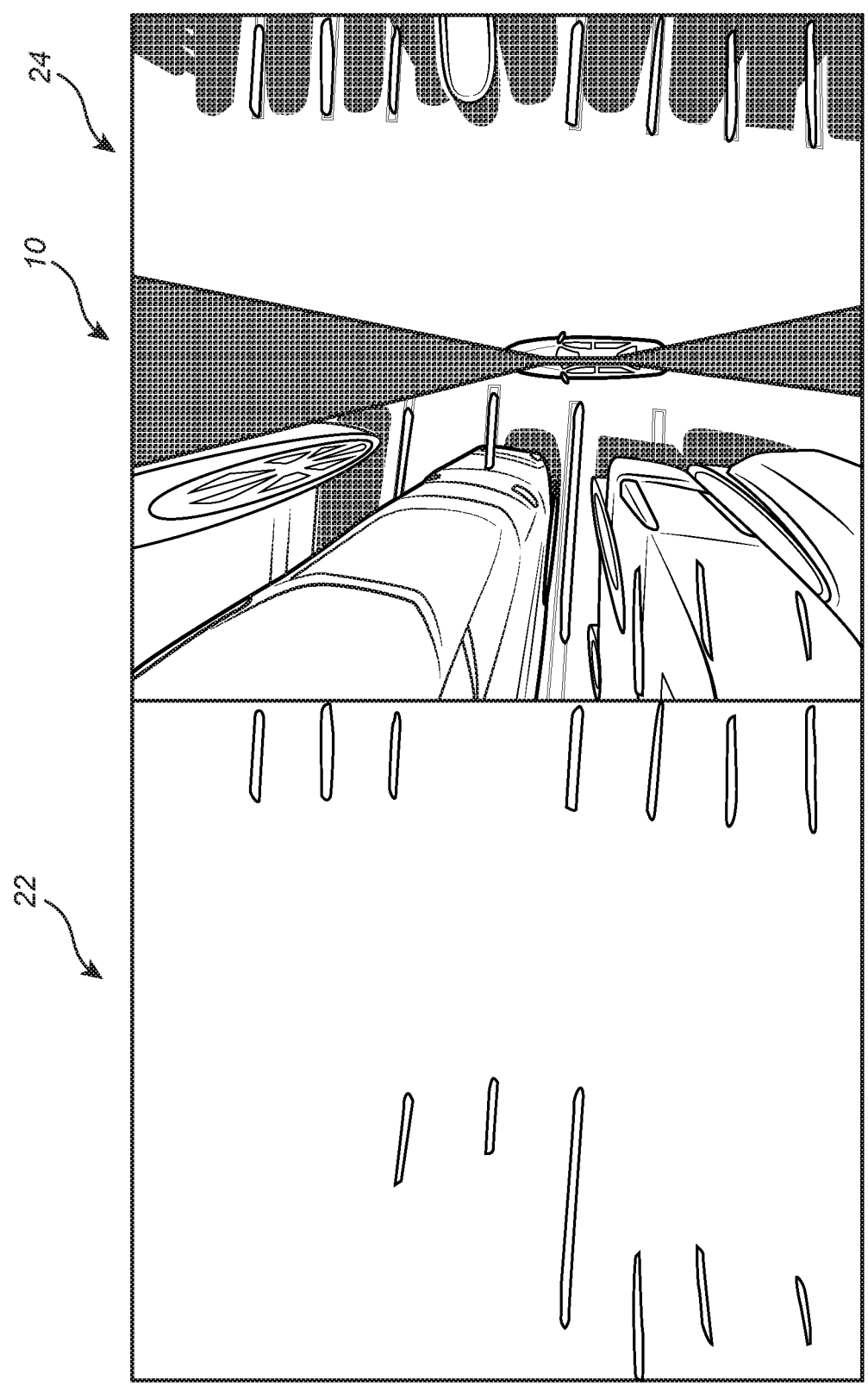
FIG. 3 is a series of camera images illustrating an output binary image of the DNN segmentation step superimposed on an input BEV image of the DNN segmentation step (collectively a combined image), highlight the coincidence of the parking line markers and parking spots.

FIG. 3 illustrates an output binary image 22 superimposed on an input BEV image 10 (collectively a combined image 24), highlight the coincidence of the parking line markers and parking spots.

Figure 4:
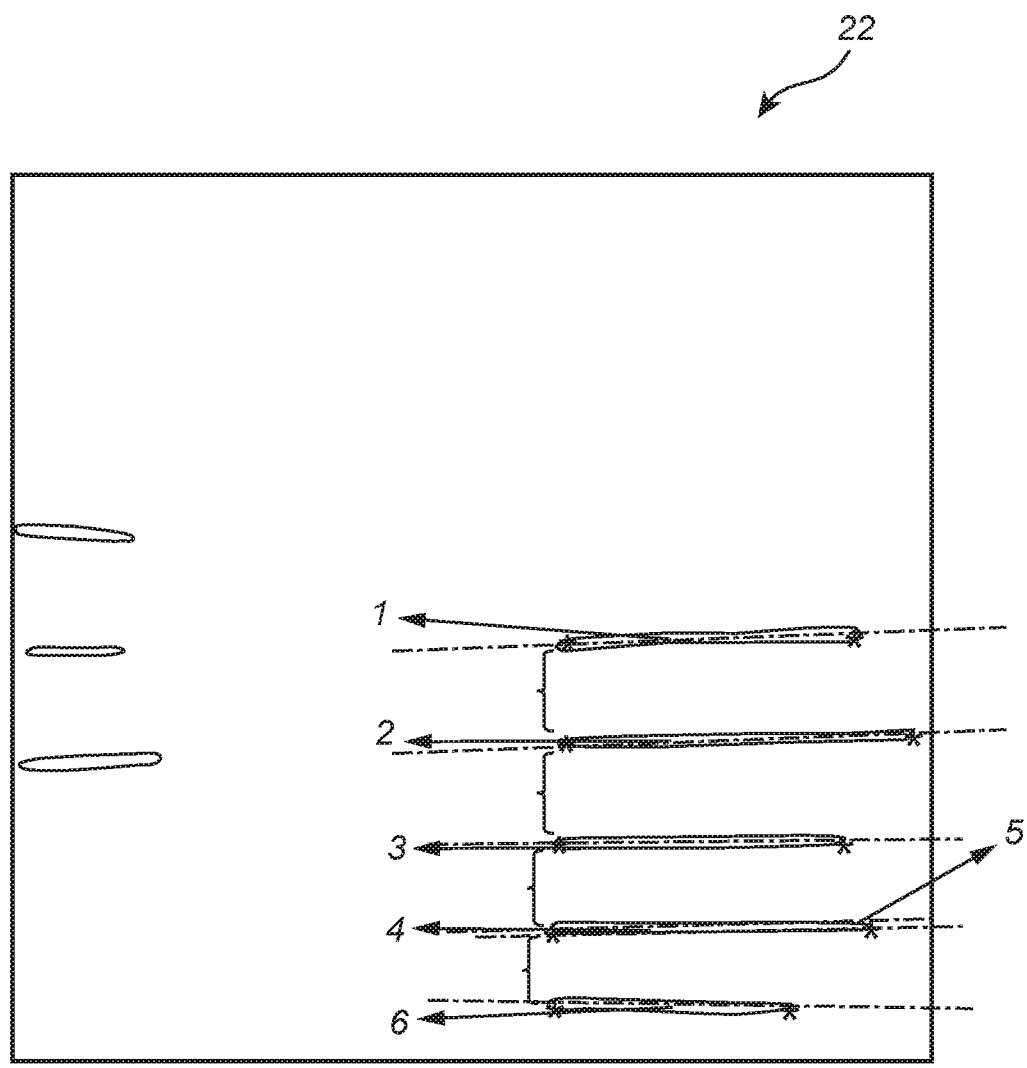
FIG. 4 is a schematic diagram illustrating the binary image processing step of the present invention—where the binary image is input into the algorithm and detected and paired parking line markers representing the parking spots are output from the algorithm.

Referring now specifically to FIG. 4, in the binary image processing step, there are two options: (1) using predicted binary images 22 to mask original images 10 and then run the same pipeline on a smaller search space to improve accuracy and speed and (2) find parking line markers directly from the binary images, as in lane marking detection, well known to persons of ordinary skill in the art, by separating different connected pixel groups, performing line fitting in each pixel group, grouping based on similarity, finding endpoints, and ultimately pairing the parking line markers accordingly.

The binary image processing step is conceptually split into two sub-steps: line detection and line pairing.

Related to line detection, pixel "blobs" are first found by searching connected components in a binary image. A two pass approach with 8 point connectivity is used, for example. In a first scan, a new label is assigned to a current pixel if neighbors of the current pixel are all 0 and increment label=label+1. If there is a non-zero value pixel in the neighbors, a smallest of the neighbor labels is assigned to the current pixel. Meanwhile, the equivalence of the labels is recorded when assigning the smallest label in the neighbors. In a second scan, for every pixel, the smallest label is assigned among the equivalence labels recorded from the first scan. For each pixel "blob" (i.e., connected pixel group), if the pixel "blob" is large enough, then a least squares fitting is performed using the general form of a linear line function: $ax+by+c=0$. Endpoints of the line segments are then identified. If $b=0$ or the slope of the line $abs(a/b)>1$, endpoints are assigned based on y-value first by taking y_min and y_max. If the slope<1, endpoints are assigned based on x-value first by taking x_min and x_max. Line segment length is calculated by checking the distance between the two endpoints. If the line segment length<Threshold1, then the following procedure is skipped and the process continues for the next pixel "blob." If the line segment length>=Threshold1, then the line function parameters a, b, and c, pixel "blob" line segment length, and the corresponding endpoints for the pixel "blob" are recorded. This continues for subsequent pixel "blobs." All line functions are then extracted mathematically from the pixel "blobs," however not all lines are actually individual lines, and some of lines belong to same parking line markers. Hence, merging such lines is necessary. One can simply cluster N line functions to obtain individual parking line marker functions, however this may not be a real-time solution considering an unknown number of parking spots using well known clustering algorithms. Thus, simple matrix-based computation is used, calculating the distance from all endpoints to all lines. Given all N valid pixel "blobs" visited, the distance between every endpoint (2N) of every line to all the lines (N) is calculated using the following formula:

$$d = \frac{|ax_0 + by_0 + c|}{\sqrt{a^2 + b^2}} \quad (1)$$

To reduce overhead, matrix-based computation is utilized by constructing matrices A, B, and C, each an N×N matrix with repeating columns, as original vectors a, b, and c, respectively. The result, d1, is a N×N matrix, in which dij indicates the distance from left endpoint i to line j. Similarly, an N×N matrix d2 indicates the distance from each right endpoint to each line. Via element addition of d1 and d2, one can select a (point, line) pair if 0<distance<Threshold2. Distance 0 is necessarily excluded because the distance is 0 if the point is at its own line.

Given k unique pairs of (endpoints p1, line l2), which indicates that the endpoints p1 of line l1 also likely belong to line l2, one can rewrite such pair as (endpoints p1, endpoints p2) or (line l1, line l2). For every such matching pair (p1, p2), however, if the gap between the two line segments l1 and l2 is too large, or if both line segments are substantially long enough (indicating that these lines actually belong to two different park spots), such pair needs to be skipped and should not be merged. For all remaining unique pairs (line l1, line l2), they are regrouped as being unconnected. For example, if (line l1, line l2) and (line l2, line l3) exist, they should be regrouped as an extended pair (line l1, line l2, line l3). The line segments are merged in each extend pair by taking the leftmost endpoint and the rightmost endpoint.

Related to line pairing, the two lines of a parking spot are detected. Each line in the prior line detection result is iteratively compared with the other lines to find the relevant parking spot pair. During each iteration, there are three steps to pair the corresponding parking spot lines together. It is assumed that the lines of a parking spot are relatively parallel to each other, and that the distance between them is within a given range. Further, each line can only be paired with one or two other lines. The first step is a parallel check, where the slope of the two lines is compared. If the difference between the line slopes is smaller than a threshold, then the second step is performed. The second step is a distance check. The distance between the two lines is calculated to check if the two lines are closely located. Since the two lines are not strictly parallel, the distance is obtained by calculating the distance between the boundary points of one line and the other. The boundary points are provided in the line detection step, and, in most cases, provide the boundaries of a parking spot. The distance between the boundary points of the two lines is compared with the diagonal distance of a parking spot. This comparison is performed to remove lines located on different sides of the parking spot, but which are near one another. The third step is to remove duplication introduced by the threshold utilized. The threshold for the parking spot distance is set relatively wider than the actual parking spot distance. Thus, some lines may be paired with more than two other lines, which may implicate two parking spots. In this step, a new parking spot candidate is compared with one already obtained for a single checked line. If the new parking spot candidate is located in the same direction as the one already obtained and has a smaller distance, then the new parking spot candidate is kept as the parking spot for the checked line. Thus, at most two parking spot candidates are kept for each checked line.

Figure 5:
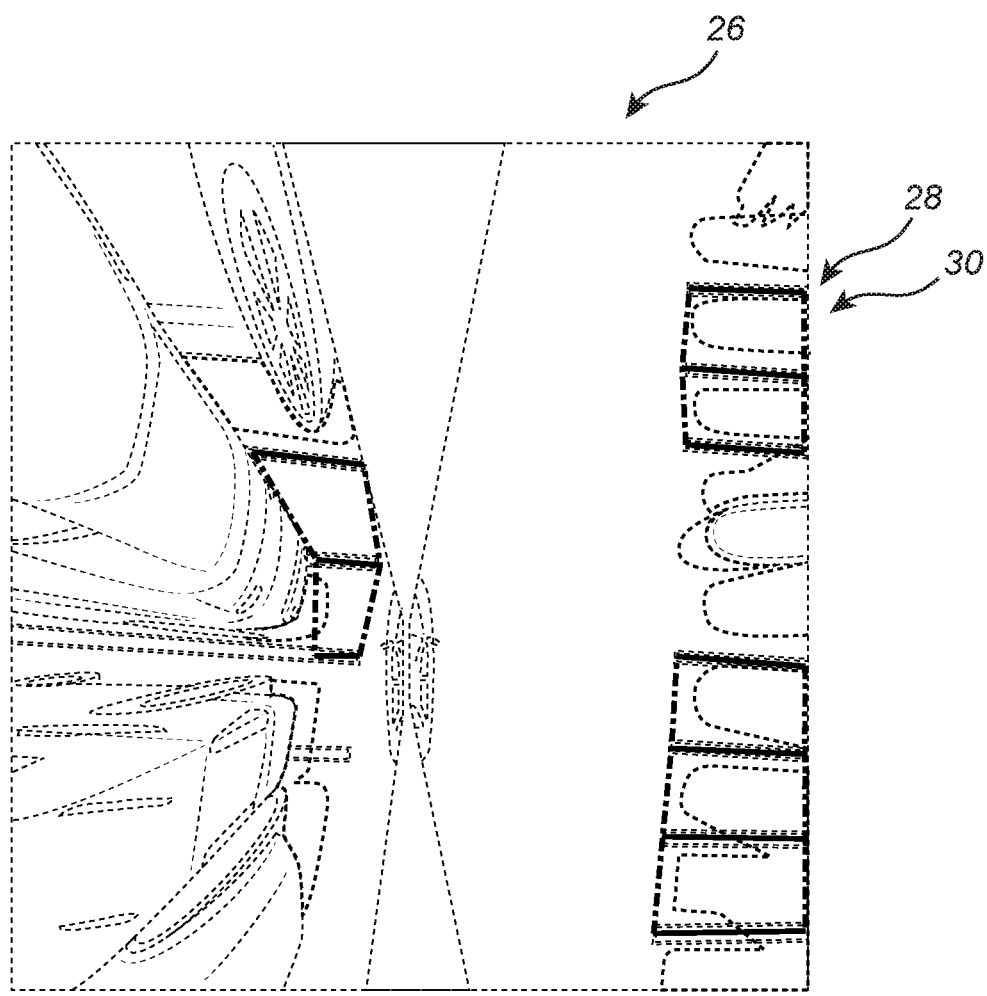
FIG. 5 is a BEV image with the detected parking line markers superimposed and grouped corresponding to the associated parking spots.

FIG. 5 illustrates a BEV image 26 with the detected parking line markers 28 superimposed and grouped corresponding to the associated parking spots 30.

Figure 6:
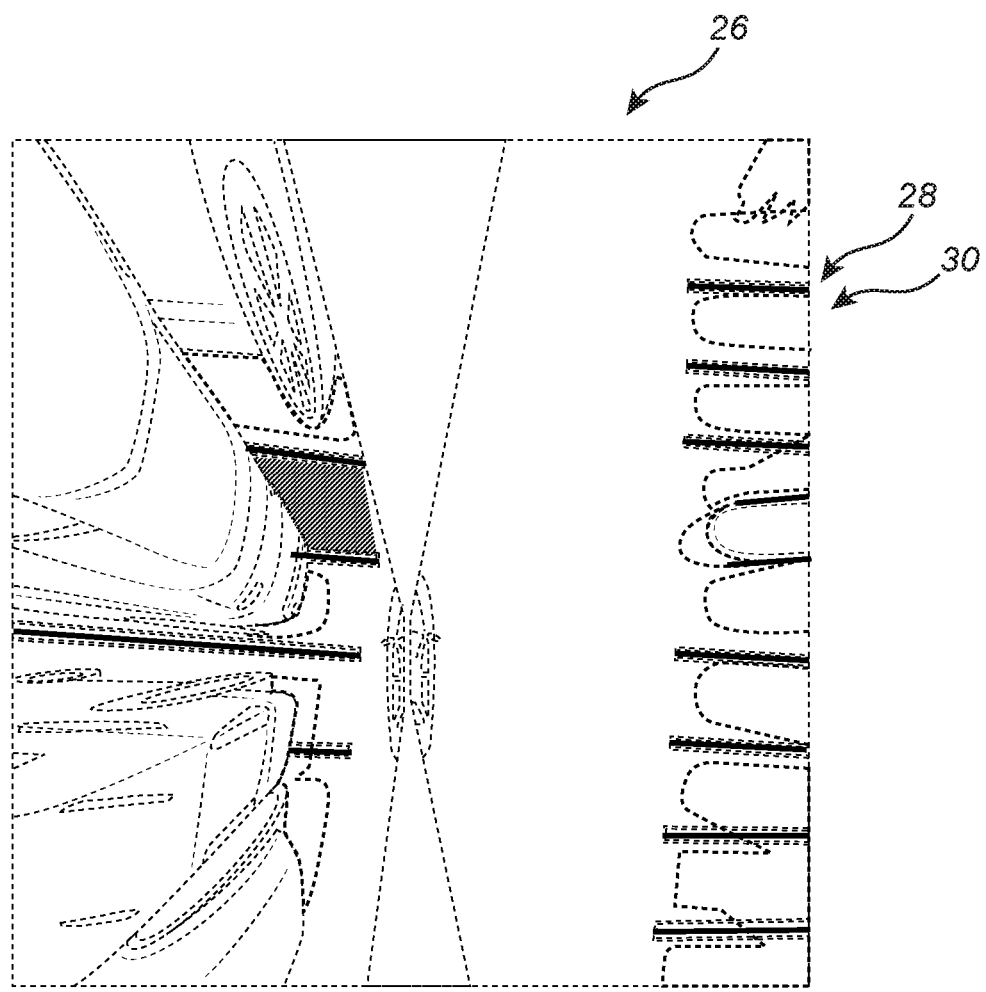
FIG. 6 is another BEV image with the detected parking line markers superimposed, as well as the corresponding parking spots 30.

FIG. 6 illustrates another BEV image 26 with the detected parking line markers 28 superimposed, as well as the corresponding parking spots 30.

Figure 7:
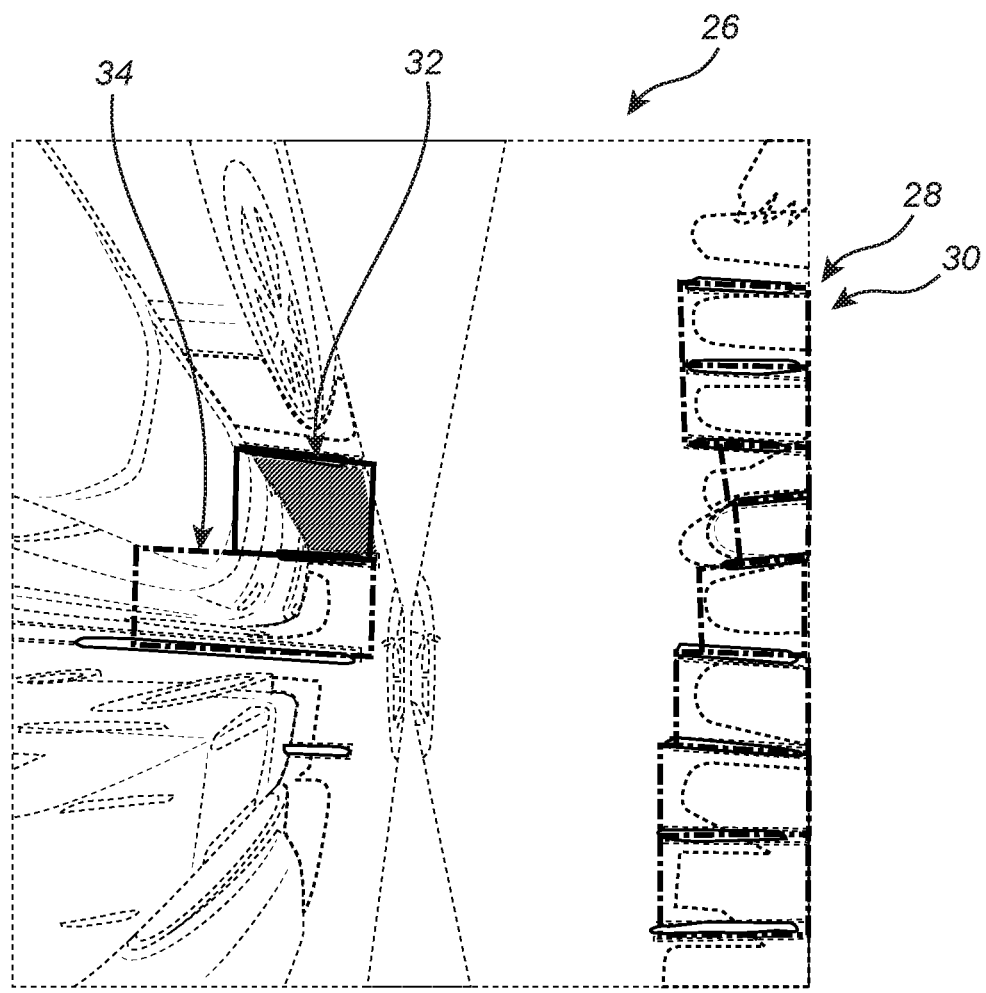
FIG. 7 is a further BEV image with the detected parking line markers superimposed, as well as the corresponding parking spots, with the parking spots highlighted by color-coded rectangles, indicating an open parking spot and an occupied parking spot, respectively.

FIG. 7 illustrates a further BEV image 26 with the detected parking line markers 28 superimposed, as well as the corresponding parking spots 30, with the parking spots highlighted by color-coded rectangles 32 and 34, indicating an open parking spot 32 and an occupied parking spot 34, respectively.

Figure 8:
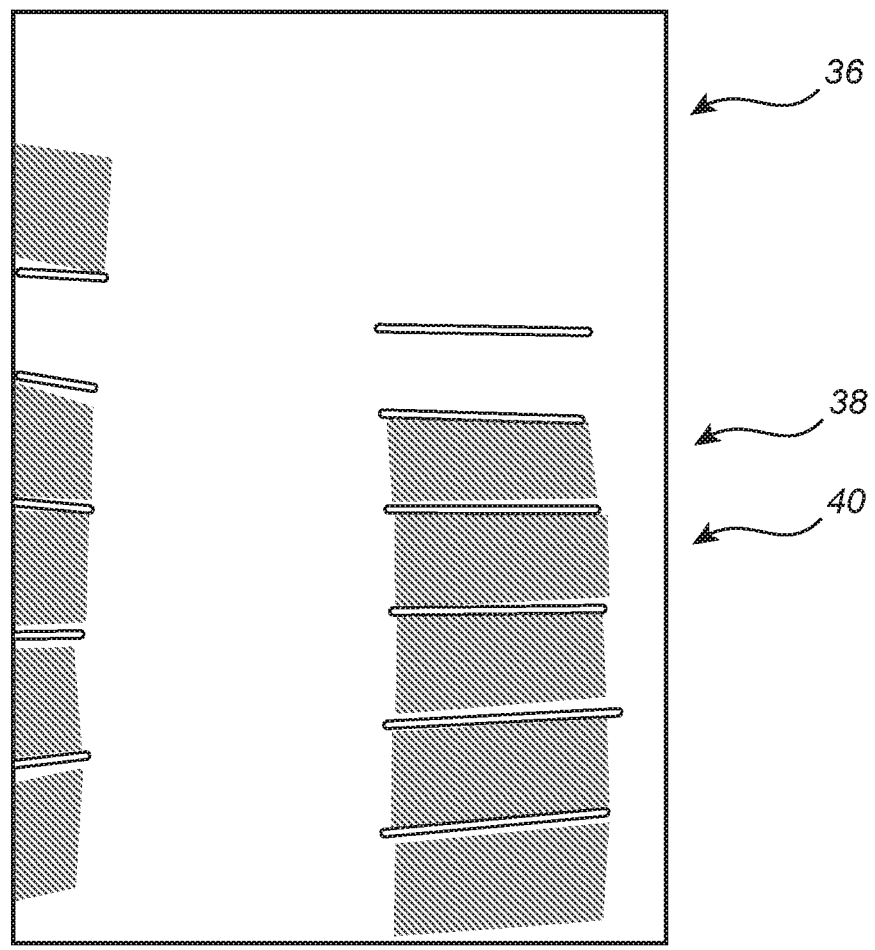
FIG. 8 is a binary image illustrating a multi-class application of the present invention.

The system of the present invention not only detects and pairs parking line markers, but also detects and classifies the spaces between the lines, i.e. parking spaces/spots, as illustrated in FIG. 6. This enables the "rectangle representation" of FIG. 7. This can be extended to more classes/types. Referring now specifically to FIG. 8, the process of detecting parking spots is essentially the same as for detecting parking line markers, but instead of segmenting the images into 2 (or binary) classes (lines and background), one now segments the images into 3 (or multiple) classes (background 36, parking spaces/spots 38, and lines 40).

Preferably, the software application/algorithm/method of the present invention is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. Input/output (I/O) interfaces can be used to receive user input and/or for providing system output. User input can be provided via, for example, a keypad, a touch screen, a scroll ball, a scroll bar, buttons, a voice-activation system, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables the user to interact with the memory.

Additionally, the I/O interfaces may further include an imaging device, i.e. the camera(s), etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Thus, again, the present invention provides parking spot detection methods and systems that detect and pair parking line markers, improving the accuracy and speed of parking spot detection in vehicular DA and AD applications. These methods and systems incorporate three major steps: (1) preprocessing—one or more standard camera images are input into the algorithm and a BEV image is output from the algorithm; (2) DNN segmentation of parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spots are output from the algorithm.

Further, the methods and systems of the present invention can be used to detect a vacant parking spot from parking line markers that are paired, as described above. The methods and systems can also be used to detect parking spots in a rectangle representation mode, this can be done either by deriving the rectangles from the detected parking line markers and spots or by directly inferencing the rectangles using a trained DNN. The methods and systems can further be used to detect the entrances of detected parking spots.

Figure 10:
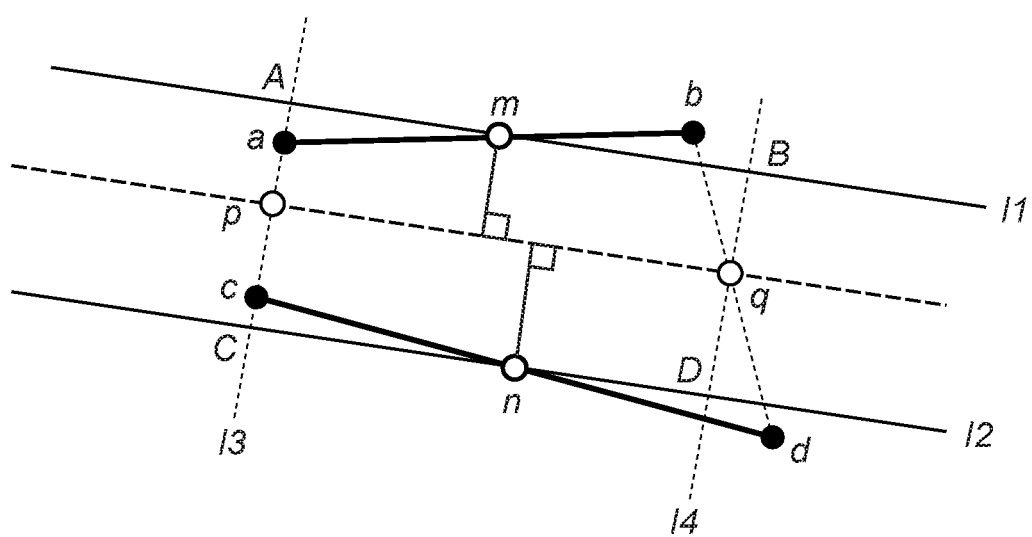
FIG. 10 is a schematic diagram illustrating a paired parking line markers-to-rectangles algorithm of the present invention.

Referring to FIG. 10, in the paired parking line markers-to-rectangles case, when two parking line markers are detected and paired, the space between the paired parking lanes/lines is essentially the parking spot (whether empty or occupied). However, the enclosed space between the two parking line markers could be any convex quadrilateral shape, which leads to difficulty for parameter encoding, and thereafter for evaluation purposes. Thus, a rectangular representation based on paired parking line markers is used.

Given that line ab and line cd are the two detected parking line makers (they may not be perfectly parallel), this forms the convex quadrilateral abcd. The middle points of each edge of quadrilateral abcd are computed, which are m, n, p, and q respectively. Hence, the major axis of the targeted rectangle is pq, which connects the middle points of the end and entrance of the park spot. Thus, the edges of the target rectangle are the ones parallel to the major axis pq and passing point m and n, which are l1 and l2. The other two edges of the target rectangle are defined by having perpendicular lines to major axis pq meanwhile passing points p and q. With these steps, rectangle ABCD is obtained, and that is the one that must be encoded to represent the detected parking spot.

One should note that the encoding here is a rectangular, rather than a parallelogram (especially for angled parking). Rectangular representation is preferred and adopted because the actual occupied parking spot by a vehicle is a rectangle and it needs fewer parameters to encode than a parallelogram, hence this provides ease for later evaluation.

Parking occupancy detection is essentially dependent on pixel percentage of detected empty parking spot inside the rectangle representing the parking spot. The empty parking spot, which can be arbitrarily shaped, is the raw binary output from a deep learning semantic segmentation algorithm, while the rectangular representation is formed following the procedure above. In the case where the empty parking spot pixel percentage inside the rectangle is larger than a predetermined threshold, an empty parking spot is determined. An example is illustrated in FIG. 11, where rectangules are drawn to represent the parking spots, while a given color or coding indicates that a specific parking spot is not occupied, while another given color or coding indicates that a specific parking spot is occupied.

Alternatively, a DNN is trained with parking spots annotated by rectangles to directly detect a parking spot in a rectangle representation. The input of the network is the BEV image, while the output of the network is rectangles representing the parking spots. The rectangles have class/type information for different types of parking spots. The present invention is also capable of detecting the entrances of the parking spots.

Although the present invention is illustrated and described herein with reference to aspects and examples thereof, it will be readily apparent to persons of ordinary skill in the art that other aspects and examples may perform similar functions and/or achieve like results. All such equivalent aspects and examples are within the spirit and scope of the present invention, are contemplated thereby, and are intended to be covered by the following non-limiting claims for all purposes.

What is claimed is:

1. A method for detecting a parking spot in a camera image, comprising:
   obtaining one or more camera images from one or more vehicle cameras, wherein the one or more camera images comprise one or more of a front camera image, a left-side camera image, a right-side camera image, and a rear camera image;
   preprocessing the one or more camera images by transforming the one or more camera images into a bird's-eye-view camera image;
   segmenting a plurality of parking line markers from the bird's-eye-view camera image using a deep neural network and outputting a binary image distinguishing the plurality of segmented parking line markers from other portions of the image; and
   selecting and pairing certain parking line markers to detect one or more parking spots in one or more of the bird's-eye-view camera image and the one or more camera images.

2. The method of claim 1, further comprising one or more of: displaying the detected one or more parking spots to an operator superimposed on one or more of the bird's-eye-view camera image and the one or more camera images in a driver assist application and using the detected one or more parking spots to maneuver a vehicle in an autonomous driving application.

3. The method of claim 1, wherein the preprocessing comprises calibrating the one or more vehicle cameras to obtain parameters and distortion coefficients, undistorting the one or more camera images using the parameters and distortion coefficients, calculating a homographic matrix by mapping coordinates in one or more image planes of the one or more camera images to coordinates in a ground plane of the bird's-eye-view camera image, and transforming the one or more camera images into the bird's-eye-view camera image using the homographic matrix.

4. The method of claim 1, wherein the segmenting comprises using an "encoder" network for feature extraction and a "decoder" network for upsampling and generating results from encoded features.

5. The method of claim 1, wherein the deep neural network is trained using a plurality of annotated and labeled images, wherein the images are per-pixel annotated with polylines, wherein a predefined width is assigned to the polylines, and wherein only center positions of parking line markers are annotated.

6. The method of claim 1, wherein the selecting and pairing comprises using the binary image to mask the bird's-eye-view camera image and then running a same pipeline on a predetermined search space.

7. The method of claim 1, wherein the selecting and pairing comprises finding the parking line markers directly from the binary image by separating different connected pixel groups, performing line fitting in each pixel group, grouping based on similarity, finding endpoints, and ultimately pairing the parking line markers accordingly.

8. The method of claim 1, further comprising superimposing one or more shapes over the detected one or more marking spots in the bird's-eye-view camera image, wherein the one or more shapes are coded with data indicating a parking spot type for each of the detected one or more parking spots.

9. The method of claim 1, wherein segmenting the plurality of parking line markers further comprises segmenting a background and one or more associated parking spots.

10. A system for detecting a parking spot in a camera image, comprising:
one or more vehicle cameras for obtaining one or more camera images, wherein the one or more camera images comprise one or more of a front camera image, a left-side camera image, a right-side camera image, and a rear camera image; and
a processor executing an algorithm for:
preprocessing the one or more camera images by transforming the one or more camera images into a bird's-eye-view camera image;
segmenting a plurality of parking line markers from the bird's-eye-view camera image using a deep neural network and outputting a binary image distinguishing the plurality of segmented parking line markers from other portions of the image; and
selecting and pairing certain parking line markers to detect one or more parking spots in one or more of the bird's-eye-view camera image and the one or more camera images.

11. The system of claim 10, further comprising one or more of: a display for displaying the detected one or more parking spots to an operator superimposed on one or more of the bird's-eye-view camera image and the one or more camera images in a driver assist application and a processor executing an algorithm for using the detected one or more parking spots to maneuver a vehicle in an autonomous driving application.

12. The system of claim 10, wherein the preprocessing comprises calibrating the one or more vehicle cameras to obtain parameters and distortion coefficients, undistorting the one or more camera images using the parameters and distortion coefficients, calculating a homographic matrix by mapping coordinates in one or more image planes of the one or more camera images to coordinates in a ground plane of the bird's-eye-view camera image, and transforming the one or more camera images into the bird's-eye-view camera image using the homographic matrix.

13. The system of claim 10, wherein the segmenting comprises using an "encoder" network for feature extraction and a "decoder" network for upsampling and generating results from encoded features.

14. The system of claim 10, wherein the deep neural network is trained using a plurality of annotated and labeled images, wherein the images are per-pixel annotated with polylines, wherein a predefined width is assigned to the polylines, and wherein only center positions of parking line markers are annotated.

15. The system of claim 10, wherein the selecting and pairing comprises using the binary image to mask the bird's-eye-view camera image and then running a same pipeline on a predetermined search space.

16. The system of claim 10, wherein the selecting and pairing comprises finding the parking line markers directly from the binary image by separating different connected pixel groups, performing line fitting in each pixel group, grouping based on similarity, finding endpoints, and pairing the parking line markers.

17. The system of claim 10, wherein the algorithm further superimposes one or more shapes over the detected one or more marking spots in the bird's-eye-view camera image, wherein the one or more shapes are coded with data indicating a parking spot type for each of the detected one or more parking spots.

18. The system of claim 10, wherein segmenting the plurality of parking line markers further comprises segmenting a background and one or more associated parking spots.

* * * * *